Sept. 15, 1959 V. RAUTIO 2,903,993
VISUAL GAUGE FOR OIL FILTERS
Filed Feb. 12, 1958
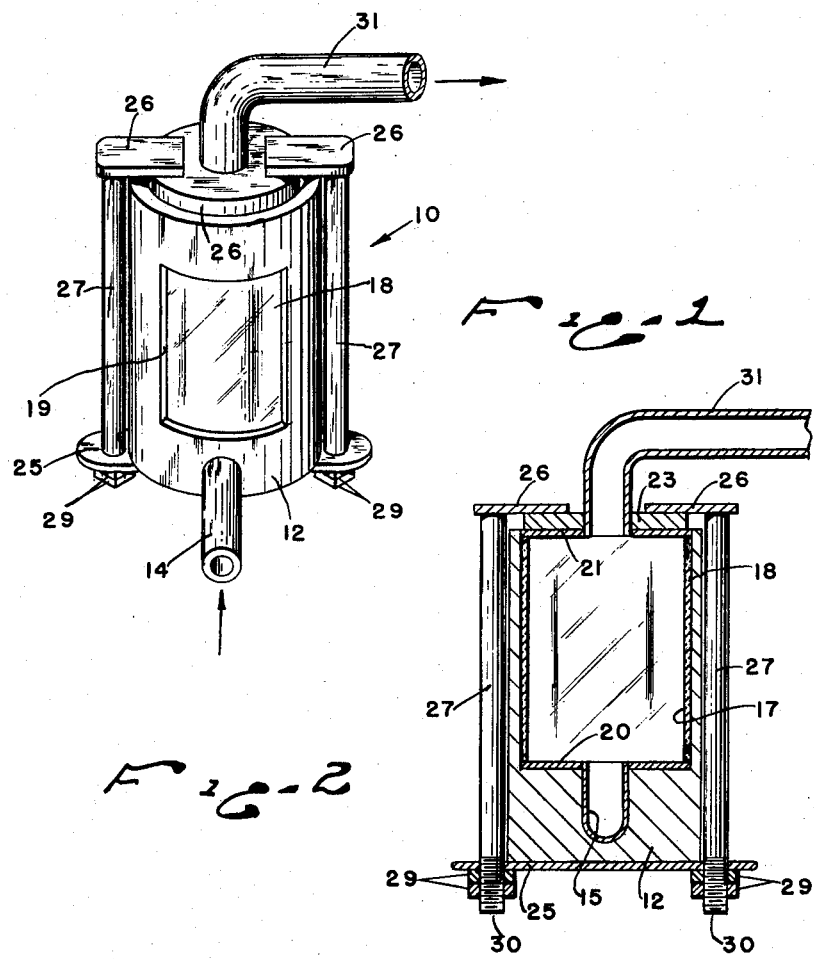
INVENTOR.
VILHO RAUTIO

United States Patent Office 2,903,993
Patented Sept. 15, 1959

2,903,993

VISUAL GAUGE FOR OIL FILTERS

Vilho Rautio, Mokomon, Ontario, Canada

Application February 12, 1958, Serial No. 714,749

3 Claims. (Cl. 116—117)

This invention relates to internal combustion engines and more particularly to oil filters therefor.

It is an object of the present invention to provide an oil inspection tube for oil filters which would permit the oil passing from the filter to be visually inspected at all times.

Another object of the present invention is to provide a visual sight inspection device for oil filters of the above type that is permanently connected in the oil supply line associated with the internal combustion engine so as to require a minimum amount of care and maintenance.

Other objects of the invention are to provide a visual sight inspection device for oil filters bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a perspective view of a visual sight inspection gauge device made in accordance with the present invention; and Figure 2 is a longitudinal cross sectional view of the sight inspection device shown in Figure 1.

Referring now more in detail to the drawing, a visual sight inspection device 10 made in accordance with the present invention is shown to include a main casing 12 having an inlet tube 14 in direct communication with an inlet duct 15 in the bottom portion of the casing. The upper portion of the casing includes an enlarged longitudinal bore 17 that slidably receives a transparent glass section of tubing 18. The side wall of the casing is provided with a central cut out 19 through which the glass tube can be observed at all times. An annular gasket 20 provides an effective seal between the lower end of the casing 12 and the lower end of the glass tube 18, while a similar annular gasket 21 provides a similar effective seal between the upper end of the glass tube 18 and an overlying cover plate 23.

All of the parts of the gauge are securely held together by means of a clamp that includes a saddle bar 25 which extends diametrically across the bottom of the casing 12, through which a pair of longitudinally extending bolts 27 extend along diametrically opposite sides of the casing 12 toward the upper end thereof. The upper ends of the bolts 27 are provided with integral inwardly extending flanges 26 that engage upon the top of the cover plate 23. Thus, by tightening the lock nuts 29 carried upon the threaded stud ends 30 of the bolts 27, the upper and lower portions of the visual sight inspection device are tightly drawn together. An outlet tube 31 extending through the cover plate 23 into association with the upper end of the glass tubing 18 may be connected to the internal combustion engine that draws the oil from the filter with which the inlet tubing 14 is connected.

It will now be recognized that all of these aforementioned parts may be integrally and permanently secured together since they are intended to be permanently inserted into the oil supply line of the engine. As a result, the visual sight inspection device requires a minimum amount of attention and maintenance and provides a visual means for observing the oil supplied at all times.

While various changes may be made in the detail construction, it shall be understood that such changes shall be within the spirit and scope of the present invention as defined by the appended claims.

What I claim as new and desire to protect by Letters Patent of the United States is:

1. A visual sight inspection device for oil filters comprising, in combination, a casing having a base, an oil duct within said base, an oil inlet tube connected to said duct, said casing defining an enlarged upper bore, a transparent glass tube received within said upper bore having a lower end in communication with said oil duct, a cover plate in said upper bore, an outlet pipe connected with said cover plate in communication with the top of said glass tube, a window opening in said casing for observing a portion of said glass tube, a gasket carried by said casing in sealing engagement with said lower end of said glass tube, a second gasket carried by and in sealing engagement with said upper rim portion of said glass tube, said cover plate overlying said second gasket, whereby oil entering said oil inlet tube passes through said duct and outwardly through said oil outlet tube.

2. The combination according to claim 1, further comprising clamp means urging said gaskets into sealing engagement with said glass tube and said cover plate and casing.

3. The combination according to claim 2, wherein said clamp means comprises a saddle bar extending across the bottom of said casing, a pair of bolts extending through said saddle bar at diametrically opposite sides of said casing toward the upper end thereof, a flange secured to each said bolt overlying said cover plate, and lock nuts threadingly carried by the lower ends of said bolts for pressure abutment with the lower side of said saddle bar.

References Cited in the file of this patent

UNITED STATES PATENTS

| | | |
|---|---|---|
| 1,428,670 | Williams et al. | Sept. 12, 1922 |
| 1,886,444 | Wurster | Nov. 8, 1932 |
| 1,893,233 | Hull | Jan. 3, 1933 |